(12) United States Patent
Factor

(10) Patent No.: US 6,281,810 B1
(45) Date of Patent: Aug. 28, 2001

(54) REDUNDANT AVIONICS FOR CRITICAL FLIGHT INSTRUMENTS

(75) Inventor: Richard Factor, Kinnelon, NJ (US)

(73) Assignee: Eventide Inc., NJ (US)

( * ) Notice: Subject to any disclaimer, the term of this patent is extended or adjusted under 35 U.S.C. 154(b) by 0 days.

(21) Appl. No.: 09/211,103

(22) Filed: Dec. 15, 1998

(51) Int. Cl.$^7$ .................................................. G01C 21/00
(52) U.S. Cl. ............................ 340/971; 340/973; 701/14
(58) Field of Search ................................... 340/971, 973, 340/974, 975, 980, 945; 701/3, 14, 9

(56) References Cited

U.S. PATENT DOCUMENTS

| | | | |
|---|---|---|---|
| 4,371,870 | * 2/1983 | Biferno . | |
| 4,647,967 | * 3/1987 | Kirschner et al. | 350/172 |
| 4,658,359 | 4/1987 | Palatucci et al. . | |
| 4,698,785 | * 10/1987 | Desmond et al. | 371/24 |
| 4,845,495 | 7/1989 | Bollard et al. | 340/973 |
| 4,860,007 | * 8/1989 | Konicke et al. | 340/979 |
| 4,918,619 | * 4/1990 | Orloff et al. | 244/135 C |
| 5,297,052 | 3/1994 | McIntyre et al. . | |
| 5,508,928 | 4/1996 | Tran . | |
| 5,663,732 | 9/1997 | Stangeland et al. | 342/357 |
| 5,739,769 | 4/1998 | Vladimir et al. | 340/945 |
| 5,883,586 | * 3/1999 | Tran et al. | 340/945 |

\* cited by examiner

Primary Examiner—Brent A. Swarthout
(74) Attorney, Agent, or Firm—Ostrolenk, Faber, Gerb & Soffen, LLP

(57) ABSTRACT

Redundant avionics for flight instruments: a plurality of aircraft flight data sensors, which provide data that are normally displayed on indicators in the cockpit, are transmitted to two independent computers. Each computer is associated with and creates images representative of data sensed by the sensors on a respective projected image display creation device which is in the form of a liquid crystal display, for example. Associated illumination sources and one common or two respective sets of optics project the images from each image creation device on a new screen. The image creation device and the optics would cause the image representative of data from the same sensor to be projected to the same location on the screen regardless of which computer and image creation device provided and projected the image. The computers are independently operable for selectively causing the display of information corresponding to data received from none, some or all of the sensors. For example, the computers are operable so that one display device will display information corresponding to data received from some of the sensors and the other display device will display information corresponding to data received from other sensors and the computers are operable so that each computer may cause display of information based on all of the sensors, as required.

11 Claims, 2 Drawing Sheets

REDUNDANT AVIONICS FOR CRITICAL FLIGHT INSTRUMENTS

BACKGROUND OF THE INVENTION

The present invention relates to redundant avionics in aircraft and particularly to displaying redundant instrumentation in a small aircraft.

The safety of flight in aircraft depends upon reliable operating flight instruments, such as the altimeter, attitude indicator, heading indicator, and airspeed indicator. Pilots depend upon these and other instruments to provide the information necessary for controlling the aircraft under all regimes of flight. The instruments are particularly critical during flight in restricted visibility when the pilot does not have a horizon, a view of land, or any other visual references.

Critical flight instruments are typically separate devices, but there is enough cross-correlation among the data provided by the several instruments in an aircraft so that the failure of any one instrument should not adversely affect the safety of flight. However, failure of more than one instrument under conditions of restricted visibility can and frequently has caused aircraft destruction and loss of life due to loss of aircraft control.

The instruments currently provided in aircraft are largely "low technology" and relatively primitive mechanical devices. Far better and more useful displays could be provided to the pilot by using more modern, computerized display instruments. The major advantage of current instruments is that they provide reliable information. They are, individually, simple mechanical devices with long records of reliable operation. If one instrument fails, the others provide sufficient data for successful completion of the flight.

Modern transport aircraft employ a "glass cockpit" in which the primary flight displays are electronic rather than mechanical displays. They can provide such displays because their large instrument area provides space for multiple display screens in the cockpit. These screens can be reconfigured electronically to provide critical information even if one screen completely fails.

In contrast, smaller "general aviation" aircraft, and especially single engine piston aircraft, have insufficient room for the redundant displays that make this technology practical and safe. If a single electronic screen that displays several flight-critical instruments were to fail under adverse flight conditions, the aircraft would probably become uncontrollable. Although modern electronics is reliable, it is difficult to guarantee the kind of "uptime" necessary to allow such a screen to be the sole instrument display.

The prior art shows redundant avionics systems in aircraft for fault tolerant aircraft avionics. But those systems are not selectively directed to providing a single projected display apparatus before the pilot or other operator. U.S. Pat. Nos. 4,658,359; 5,663,732 disclose systems with two separate sets of instrumentation. But this prior art does not disclose taking information from flight data sensors, and projecting it through two separate display creation apparatus at a single display screen, e.g. in a small aircraft, wherein the failure of one display creation apparatus will not interfere with operation of the other such apparatus, so that the image representative of the data collected by the sensors will still be projected on the screen even if one set of instrumentation which projects an image toward the display screen is inoperative for any reason.

Redundant instrumentation for supplying signals to redundant displays is shown in U.S. Pat. Nos. 4,845,495 and 5,297,052. The redundant control system in U.S. Pat. No. 5,739,769 also has a cockpit glass display. But none of these shows two sets of instrumentation projecting to one display screen in a manner such that the failure of one set of instrumentation still permits the other set of instrumentation to project the full image corresponding to all of the sensed data on a single display device or screen.

SUMMARY OF THE INVENTION

The present invention provides a fully redundant instrument display that should require no more panel room in the cockpit than a non-redundant display. Because the simultaneous dual failure of a fully redundant display system is statistically improbable except in the extreme, reliability levels of the display sufficient for critical instruments should be obtainable.

The device of the invention comprises only two necessarily common components, namely a plastic (or other material) rear-projection screen placed in the cockpit where the pilot and/or other operators can see it and a metal or plastic case behind the screen. As these are completely passive mechanical components, they will not suffer from catastrophic failure unless the aircraft does. The balance of the device comprises two identical computer boards, each connected or otherwise capable of transmitting a signal to a projected visible image display creation device, in the form of an LCD or a moving-mirror reflective display device or other display device projectable with light, and a separate illumination source, lamp or other illumination means for each display creation device. Each computer and display creation device has its own power supply and each can optionally receive power either from separate aircraft generators or from backup batteries. Each computer and display creation device combination is capable of projecting all required data on the rear projection screen at the front of the unit, which is also in front of the pilot. Since the display subsystems are completely separate, the probability of failure of both simultaneously is the multiplication product of the probability of each failing separately. This will reduce the failure rate significantly below the latter figure.

The data to be projected on the screen can be obtained from appropriate individual sensor units, e.g., gyroscopes and pressure sensors, or can be incorporated in the display instrument itself by using appropriate sensors. Most sensors need not be redundant since a failure of a single sensor would not deprive the pilot of so much information as to make the flight hazardous. However, any of the sensors could be redundant, if desired.

It is preferable that the information displayed corresponding to the data from each individual sensor be projected from only one of the display creation devices. The computers will cause the respective display creation devices to project information corresponding to data from none, some or all of the sensors and selected so that information is not simultaneously projected from both image display creation devices. Either respective optics for each image display creation device or a common optics for both such devices distribute the images over the screen.

Other objects and features of the invention will be apparent from the following description of the invention which refers to the accompanying drawings.

DESCRIPTION OF A PREFERRED EMBODIMENT

Figure 1:
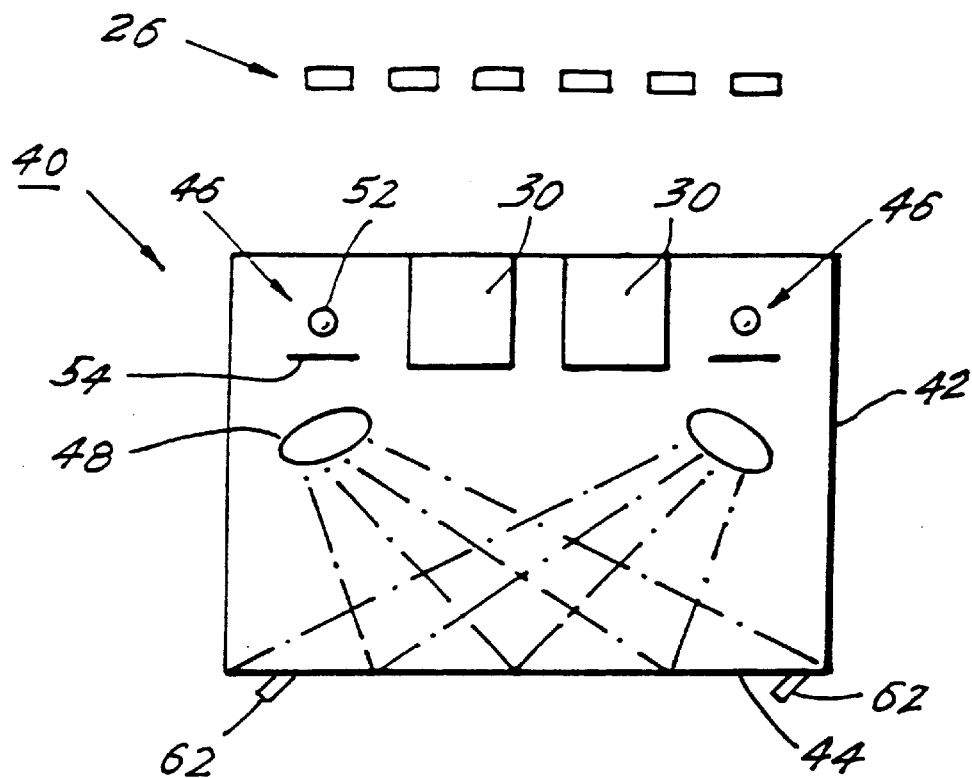
FIG. 1 is a schematic top view of the invention.
Figure 2:
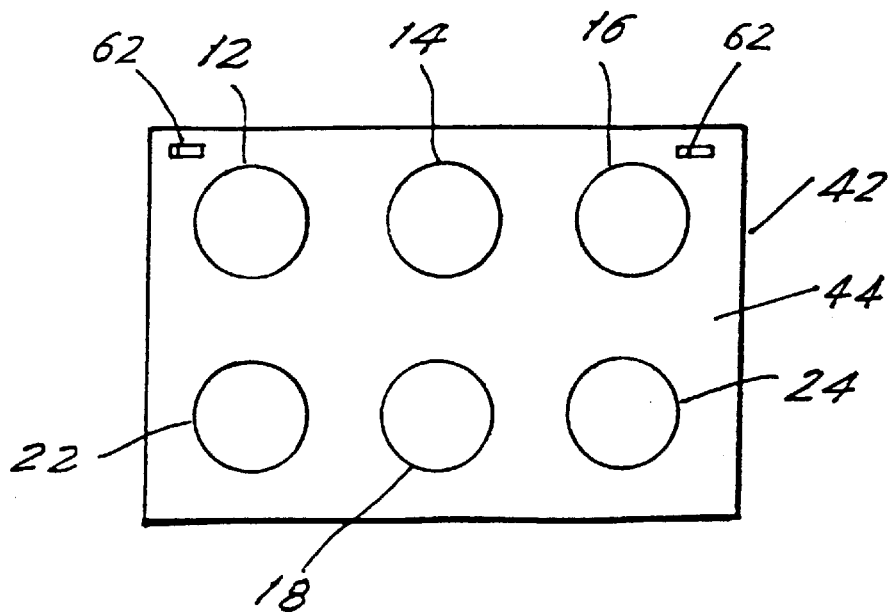
FIG. 2 is a front view thereof which the pilot observes.

In a small aircraft, the most critical instruments are arranged to display to the pilot, as in FIG. 2, in a "T" formation, in which the airspeed indicator 12 is at the left of a line of three instruments at the top of the "T", the attitude indicator or artificial horizon 14 is at the center of the line, and the altitude indicator or altimeter 16 is at the right. The bottom of the vertical bar of the "T" is the gyroscopic heading indicator 18, which could be a simple gyroscopically stabilized indicator, or could be more complicated, such as a gyroscope "slaved" to a compass or a "horizontal situation indicator". Aircraft designers are reluctant to deviate from this arrangement or display scheme for these basic instruments.

In smaller aircraft, there is no option to replace these typically mechanical instruments with more capable ones since "glass cockpit" (computer screen) readouts are precluded due to the considerations described above. One possibility would be to replace each of these instruments with an individual electronic instrument. In that case, a single instrument failure would not be too serious. But, this would require four complete electronic assemblies and would still provide less reliability than would the redundant scheme that is the subject of this invention.

Furthermore, the invention is capable of replacing even more than the four basic instruments in the "T." Two additional instruments, the rate of turn/slip indicator 22, and the vertical speed indicator 24 can also be replaced at low cost with great reliability. For example, the vertical speed of an aircraft can be derived mathematically from the altitude as it changes. Rather than have two separate mechanical devices to show essentially the same information, one could either use a single instrument (altitude indicator or barometric pressure sensor) and derive vertical speed from that, or to enhance safety, one could employ two separate pressure sensors to, in effect provide a redundant backup for both instruments.

The instruments 12–24 are connected to respective conventional aircraft condition sensors 26 conventionally arrayed at positions around the aircraft, e.g., the wings, fuselage behind the instrument panel, etc.

All of the sensors 26 to the mechanical instruments in the "T" can easily provide their information in electronic form instead of by moving a dial on the face of an indicator. Electronic information has an advantage because it eliminates one source of unreliability, i.e., the mechanical linkage to the dial. Once sensor information is in electronic form, such as a voltage or current, the same sensor information from one sensor can be supplied to multiple redundant computers 30 of the invention. It is easy to prevent, such as by resistive coupling, the catastrophic failure of either computer 30 from affecting the sensor readout fed to the other computer. This invention contemplates the use of electronic signals fed to two separate, isolated computers 30, from all of the aircraft condition sensors 26. For example, sensors could be provided that generate the following data:
1: Airspeed 0 to 200 kts: 0–10 volts
2: Attitude: Pitch −30 to +30 degrees −10 to +10 volts
   Roll −90 to +90 degrees: −10 to +10 volts
3: Altitude: −1000 to 20,000 feet; −0.5 to +10 volts
4: Heading 0 to 360 degrees: sine and cosine of heading −10 to +10 volts These are just examples. The actual sensor output would be measured by the two computers separately and turned into "engineering units," e.g. feet, or meters, etc., as desired, by the computer software.

When the sensor outputs ("airdata") are available to the computers, each computer will measure and analyze the data. Unlike mechanical devices, the computer can perform a "sanity check" on the data. If impossible data are presented, e.g., rate of climb of 10,000 feet/minute, the computer can alert the pilot that there may be a sensor error or a computer error. The pilot can manually determine the case by examining data from the other computer. If there is a computer error, then the erroneous computer can be disabled with no loss of data. If there is a sensor error and no backup sensor, then the pilot has no less information than if the instrument had failed individually.

In the practical embodiment of the invention illustrated herein, a number of separate aircraft instruments are replaced by a single "glass cockpit" instrument 40. This instrument will typically take the place of the four instrument "T" 12, 14, 16, 18 as described above, as well as of the two instruments 22, 24 at either side of the heading indicator, typically the rate of turn/slip indicator and the vertical speed indicator.

The "glass cockpit" instrument 40 comprises a box 42 with a front surface or screen 44 which is seen by the pilot with approximate dimensions of 10" wide by 6" high (25 cm by 18 cm), which are the approximate dimensions of the space on the instrument panel of a small aircraft which is occupied by the visible displays of aircraft instruments replaced by the box 42. The depth of the box 42 is sufficient to accommodate the optical projectors 46 and the spreading of the light from the output lenses 48 in front of the projectors. Because the optical hardware and beam spreading path requires about half the internal space of the box 42, the other half is available for holding electronic circuitry and/or sensor hardware. Alternatively, the dual projector package could be tapered toward the rear (not shown) leaving external space that would previously have been occupied by the instrument bodies to be used for other purposes.

The front surface 44 is a screen on which an image may be projected. Each optical projector 46 comprises an illumination device 52, preferably a halogen or high intensity discharge lamp, which emits light that is passed through an LCD 54 or other imaging device that is driven by a respective computer 30 and its associated graphics hardware. The LCD imager should have a resolution of at least 800 pixels horizontally and 600 pixels vertically, although the system will work with less or more resolution. Each projector has its own illumination source 52, its own imaging chip 54 and its own optics assembly 48.

Figure 3:
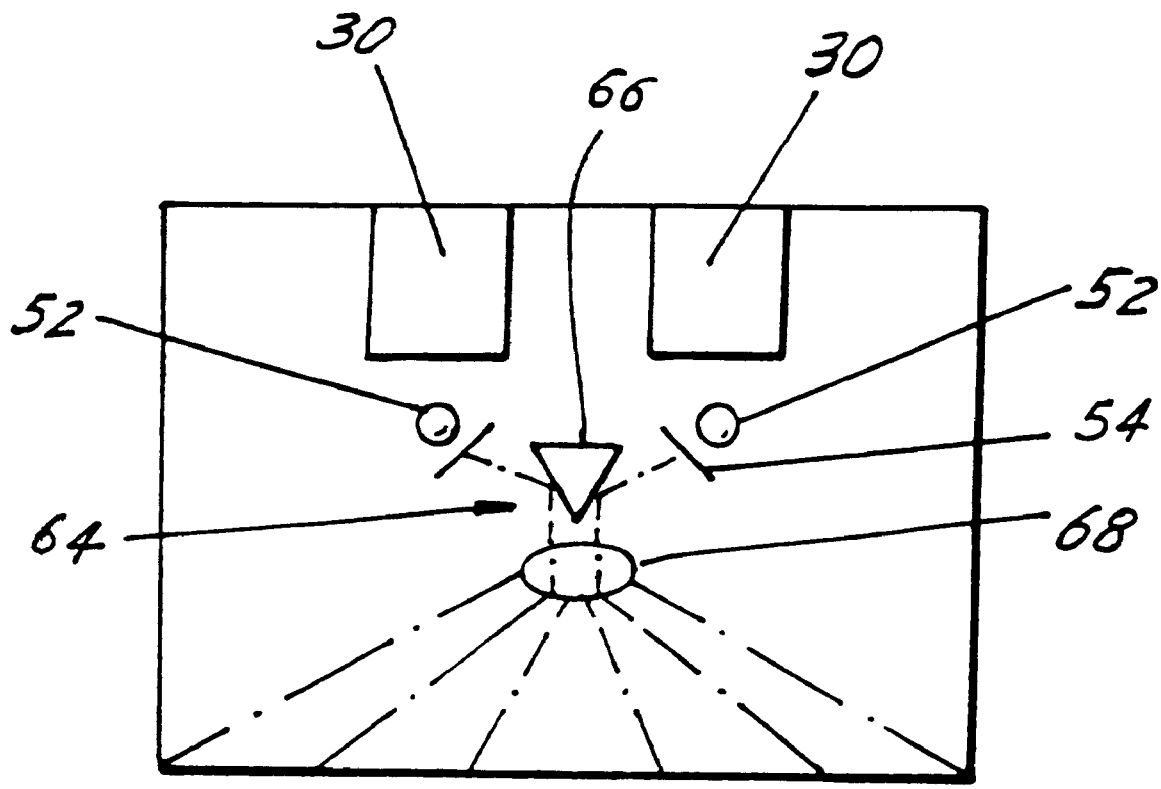
FIG. 3 is a schematic top view of an alternate embodiment of the invention.

In an alternate embodiment in FIG. 3, there is one optics assembly 64 after the separate imaging chips 54, rather than two assemblies 48. Like the screen 44, the optics assembly 48 or 64 is a mechanical structure, not an electrical apparatus subject to inopportune failure. Therefore, use of a single optics assembly 64 for directing either of the projected images on the screen 44 is an acceptable alternative. The optics assembly 64 may include one mirror, prism 66, or the like to direct the image to the screen, for example, and through one lens system 68.

The electronic hardware of computer 30 for creating the image to project the information provided by the instruments on the front surface screen 44 comprises appropriate analog-to-digital conversion circuitry to convert the airdata sensor outputs from, for example, six sensors 26 to digital form and a processor capable of reading this digital data and performing mathematical manipulations on it. This processor also converts the processed data into a pattern of colored picture elements (pixels) that form the graphic representations 12–24 on the screen 44 of the airdata from the sensors 26, which are representations that the pilot is accustomed to seeing and in the customary arrangement. Either additional electronic circuitry, an iris, cross polarization or a rotating neutral density filter, etc., controls the illumination source to provide brightness adjustment for day/night operation and to detect the failure of either illumination device 52. The two computers 30 are cross connected for the limited purpose of determining whether one illumination device (or electronic operation of the other computer) has failed. This can be in the form of a "heartbeat" or other signal that each computer sends. Neither computer depends on this signal for its own operation, and a failure of the signal from one computer will not affect the computer that receives it, other than to alert it to the failure of the sending computer. This cross-connection does not vitiate the redundancy inherent in the system.

Each projector 46, 52, 54 and its operating computer 30 is capable of illuminating the entire screen 44 and giving the pilot a display of the data from all six sensors or instruments. While it is possible for both computers to display all instruments at all times, simultaneous display of the same instrument from both computers is undesirable for two reasons. First, it requires very fine mechanical adjustment to make sure that each pixel matches on the screen for both projectors. Second, there is always a small uncertainty in the data from the sensors. For example, one computer might calculate the altitude as 15,010 feet and the other at 15,015. Although these numbers are well within the error margin for an altitude indicator, it would be confusing to the pilot show both figures at once either overlaid at the same location 16, or even offset in location. Therefore, normal operation of the computers causes one projector/computer combination to illuminate, for example, the bottom row of "instruments" or displays and the other computer to illuminate the top row. This is accomplished by the respective computer turning off the appropriate pixels in its LCD imaging unit. A simple toggle switch 62 on or near the front screen 44 is connected to each computer 40 to enable the pilot to select normal operation (as described above) or computer/projector combination of one or two to illuminate the whole screen, and to disable either redundant element if it becomes defective. Slightly more complicated control logic in the computers 30 could be enabled to reverse the two displays if, for example, the altitude sensor digitizer on one were defective, or to even replace individual "instruments" on one computer display with the instrument from the other. If failure of one illumination device 52 were detected, the computers would cause the second device 52 to automatically illuminate the whole screen instead of just its half.

While this invention is contemplated as being able to replace the basic instruments in a small aircraft with a modern "glass cockpit," it is not limited to doing so. Mechanical and early design limitations dictated the design of instruments. For example, the altimeter and vertical speed indicator each require three inches of panel space and yet present the pilot with only a single number. Other instruments are similarly inefficient. Although pilots are accustomed to the presentation of these displays, considerable improvement is possible. By appropriate combination of various other sensors and respective display elements, the avionics display instrument of the invention can display not only the basic information necessary for aircraft operation but also navigation, terrain, engine data, and other information as well, with complete redundancy and much greater utility than the basic instruments that it replaces.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. Redundant avionics for aircraft instruments, comprising:

a plurality of sensors for various displayable flight data;

two computers each able to receive the data from all of the sensors and each of the computers being operable independently of the other computer;

a respective projected visible image display creation device operated by each of the computers and each computer being operable to cause the respective display creation device to create an image representative of the data of selected ones of the sensors and to project those images;

a display screen visible to an operator for receiving the images projected from each of the display creation devices and the display creation devices projecting images onto the screen; and switching devices connected with the computers to selectively cause each computer to simultaneously create some of the images projected on the display screen through the respective image creation device.

2. The avionics of claim 1, wherein each visible image display creation device comprises an apparatus for providing a projectable image to be projected and driven by the respective computer to create that projectable image;

an illumination source for illuminating the apparatus for providing the image to be projected; and optics associated with both of the display creation devices for distributing the images created by the display creation devices over the screen.

3. The avionics of claim 2, wherein the optics comprises respective optic elements associated with each of the image display creation device for distributing the images produced by the image display creation device on the screen.

4. The avionics of claim 3, wherein the optics of each of the image display creation devices are adapted to distribute the image of the data from each sensor over the same respective area of the screen, whereby an image corresponding to the data from each sensor and projected by each of the image display creation devices would appear at the same location over the screen.

5. The avionics of claim 2, wherein the optics comprises optical elements positioned in the path of the images projected by both of the display creation devices as operated by the computer the optical elements being for directing the projected images to the screen.

6. The apparatus of claim 2, further comprising an enclosure having a front side with the screen thereon and the enclosure including therein the image display creation devices, the computers and the optics.

7. The avionics of claim 2, wherein the apparatus of the image display creation device comprises a liquid crystal display and the computer transmits a signal to the liquid crystal display for creating an image on the display which when illuminated by the illumination source will provide a visible image on the screen; and the optics comprises the illumination source directed for illuminating the liquid crystal display and focusing optical elements at one side of the liquid crystal display for focusing the projected image on the screen.

8. The avionics of claim 7, wherein the focusing optical elements are so shaped and oriented that the image formed by the respective computer on each liquid crystal display of data representative of a particular one of the sensors overlaps on a location on the screen regardless of which computer and which liquid crystal display is causing the creation of the image of the data from the particular sensor.

9. A method of providing redundant avionics for aircraft flight instruments comprising:

sensing various flight data;

transmitting a signal representing each sensed data to each of two image display creators;

creating an image through the image display creators for being projected, wherein the respective image for projection created by each image display creator selectively is derived from some or all of the various sensed flight data; and simultaneously projecting the images created through the image display creators on a screen visible to a user, each image display creator creating some of the simultaneously projected images.

10. The method of claim 9, further comprising operating the image display creators for selectively creating images representative of the data of at least some of the data sensed through one of the image display creators and for creating images representative of the other data sensed through the other of the image display creators, so that the combined images created by both of the image display creators and projected on the screen corresponds to all of the flight data sensed.

11. The method of claim 9, further comprising projecting the images created by each of the image display creators from each respective sensed flight data at the same location on the screen regardless of which of the image display creators created the image derived from that data.

* * * * *